Patented Oct. 23, 1945

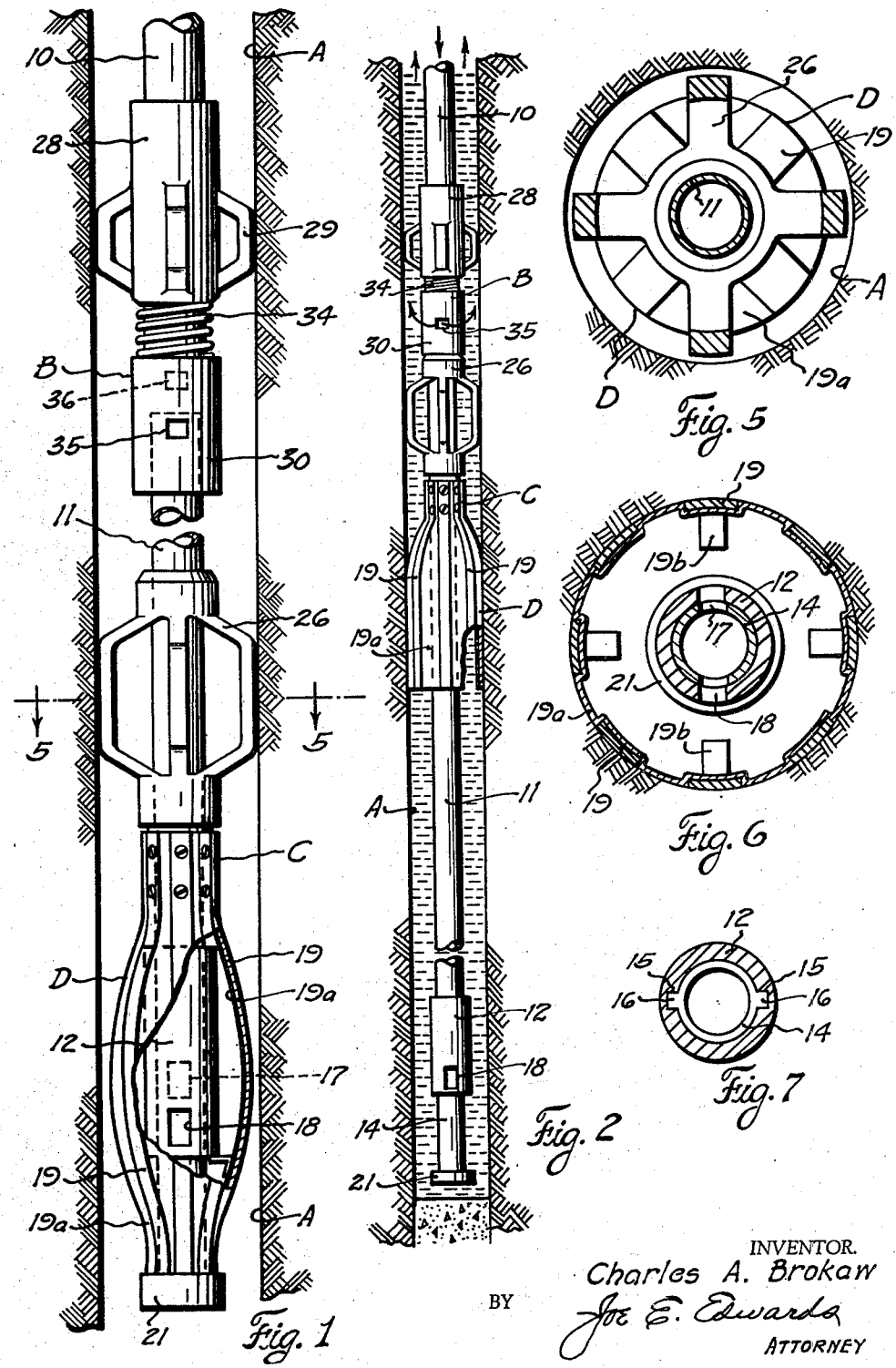

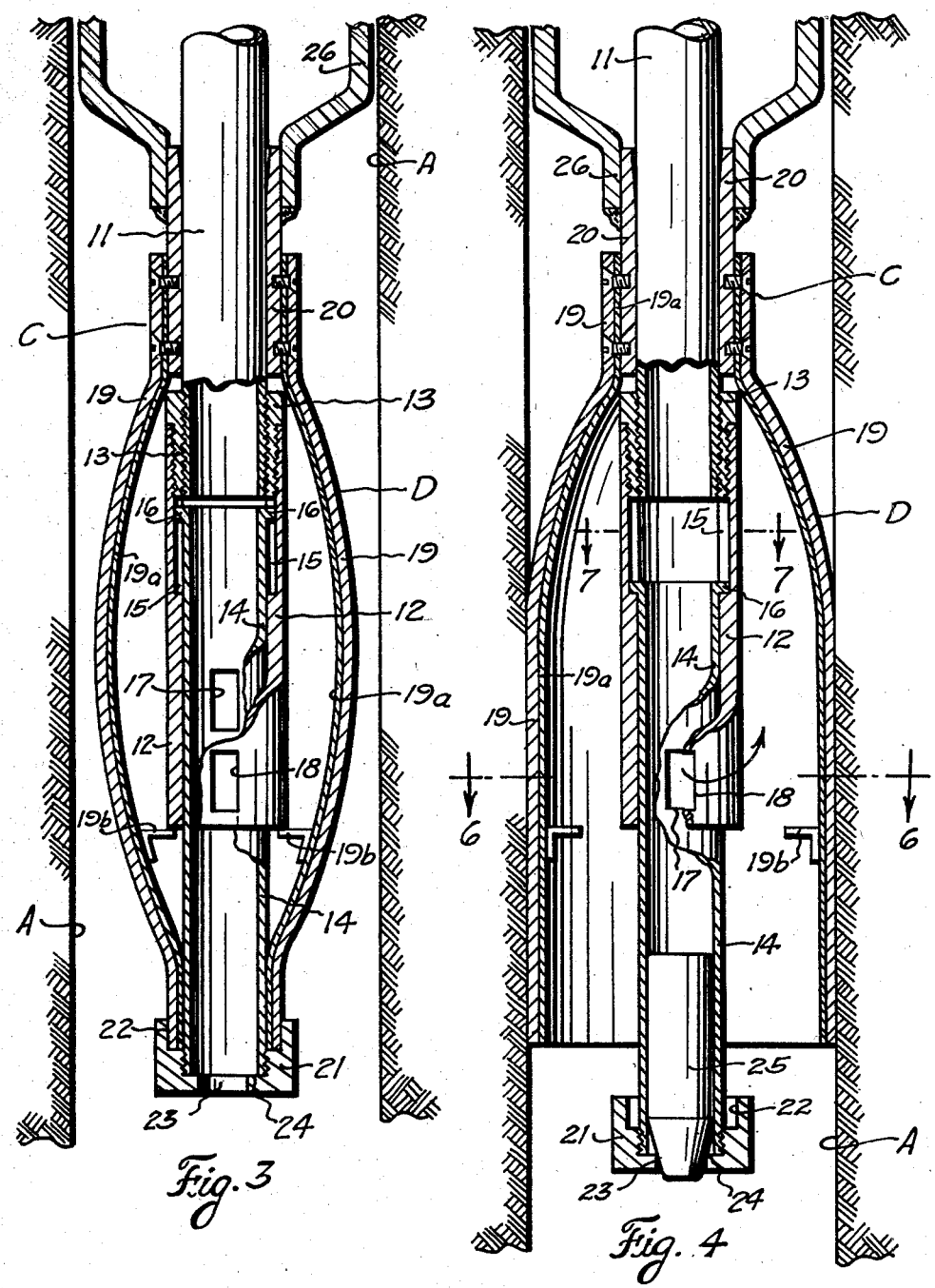

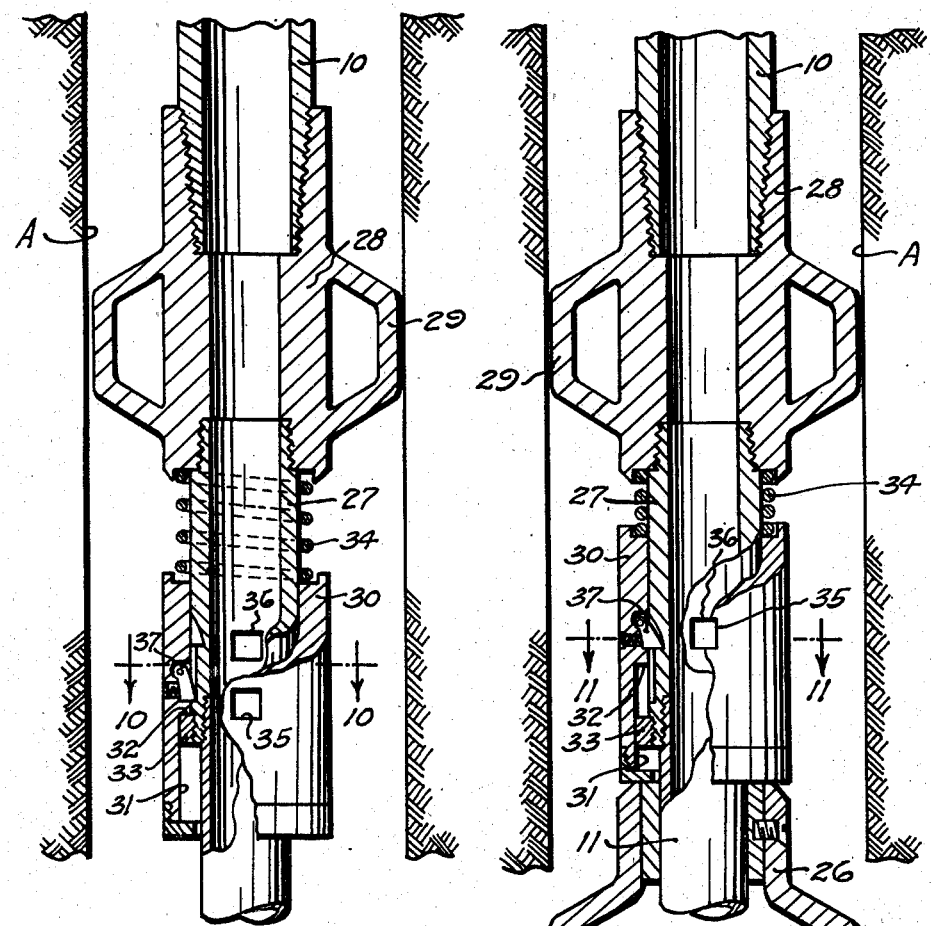
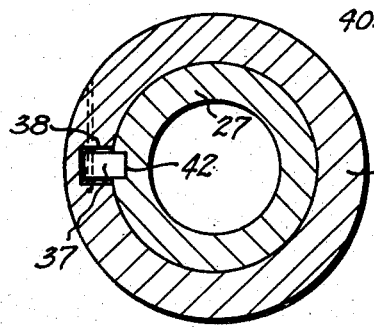
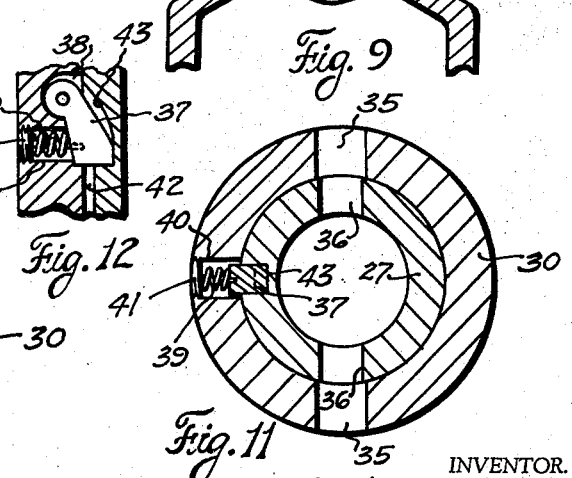

2,387,493

UNITED STATES PATENT OFFICE 2,387,493

MEANS FOR CEMENTING WELLS

Charles A. Brokaw, Houston, Tex.

Application March 1, 1943, Serial No. 477,592

11 Claims. (Cl. 166—1)

This invention relates to new and useful improvements in apparatus and means for cementing wells.

As is well known, it is common practice to introduce cement into a well bore for the purpose of plugging or closing said bore at a particular or desired elevation. Ordinarily, the cement is introduced through a pipe or conductor which extends axially within the well bore, said cement being ejected from the lower portion of said pipe. The annular space between the pipe and the well bore is filled with a mud, or other fluid, and it has been found that when the cement enters the bore, it will channel upwardly through said fluid, with the result that the cement is not maintained in a compact mass within the well bore and a solid, effective plug is not produced. This upward channeling of the cement through the mud or other fluid is due to the fact that the fluid column does not form a solid bridger which will resist the flow of the cement therethrough.

It is one object of the present invention to provide an improved well cementing apparatus which will efficiently prevent upward channeling of the cement through the fluid column, whereby the cement is retained in a more or less compact mass so that subsequent setting of said cement will form a solid plug which effectively closes the well bore.

An important object of the invention is to provide an improved well cementing apparatus having an expansible element which positively separates the cement being introduced into the well bore from the fluid column thereabove; said element being movable upwardly as additional cement is introduced, whereby the separating element offers substantially no resistance to the introduction of said cement while constantly maintaining a seal between the cement and fluid column.

A particular object of the invention is to provide an improved well cementing apparatus, of the character described, having an expansible element and also having outlet ports through which the cement is ejected, said element being normally in a retracted position and said ports being normally closed to permit the apparatus to be lowered through the well bore; the apparatus being so constructed that the element may be released for expansion and the ports opened by the application of pressure within the assembly, whereby the proper setting of the apparatus and actuation thereof is facilitated.

Still another object of the invention is to provide an improved cementing apparatus, of the character described, wherein the separating and sealing element is a flexible, umbrella-type member which is normally latched in a retracted position and which, when released for expansion, engages the wall of the well bore to span or bridge the annular space between the pipe and well bore; said element being freely slideable upon the pipe or conductor so that the cement under pressure which is introduced into the well bore below the element will move said element upwardly within said bore, whereby any desired amount of said cement may be introduced without affecting the seal formed by said element.

Another object of the invention is to provide a cementing apparatus, wherein a plug or closure is dropped or pumped downwardly through the conductor and fluid pressure applied thereto to effect a simultaneous release of the expansible element and opening of the cementing ports.

A still further object of the invention is to provide a well cementing apparatus, of the character described, having means for permitting a circulation of fluid through the well bore above the separating and sealing element, said means being normally closed and being arranged to be opened at any desired time, whereby the well pipe may be thoroughly cleaned of cement when conditions require.

Another object of the invention is to provide an improved cementing apparatus, wherein a circulating sub is mounted at the upper end of the apparatus and at the lower end of the well conductor, said sub being constructed so as to be automatically actuated by the separating or sealing element and after said element has moved a predetermined distance upwardly on the pipe or conductor.

A construction designed to carry out the invention will be hereinafter described together with other features of the invention.

The invention will be more readily understood from a reading of the following specifications and by reference to the accompanying drawings, wherein:

Figure 1 is a view, partly in section and partly in elevation of a well cementing apparatus, constructed in accordance with the invention, and showing the parts in position prior to actuation.

Figure 2 is a reduced elevation of the apparatus, showing the parts in position after operation and following the introduction of cement into the well bore.

Figure 3 is an enlarged, transverse, vertical sectional view of the lower portion of the apparatus, with the cementing ports closed and the separating element retracted.

Figure 4 is a similar view, with the ports opened and the element expanded.

Figure 5 is an enlarged, horizontal cross-sectional view, taken on the line 5—5 of Figure 1.

Figure 6 is a horizontal cross-sectional view, taken on the line 6—6 of Figure 4.

Figure 7 is a horizontal, cross-sectional view, taken on the line 7—7 of Figure 4.

Figure 8 is an enlarged transverse, vertical sectional view of the circulating sub, showing the circulating ports in a closed position.

Figure 9 is a similar view, with the circulating ports open.

Figure 10 is an enlarged, horizontal cross-sectional view, taken on the line 10—10 of Figure 8.

Figure 11 is an enlarged, horizontal cross-sectional view, taken on the line 11—11 of Figure 9.

Figure 12 is an enlarged sectional detail of the latch in the circulating sub.

In the drawings, the numeral 10 designates a tubular conductor or pipe which is adapted to be lowered into the well bore A. The improved cementing apparatus is arranged to be connected to the lower end of said conductor and includes a circulating sub assembly B which has direct connection with said conductor. An elongate section of pipe 11 connects the sub assembly with a separating element assembly C and manifestly, the tubular conductor may be utilized to lower and properly position the apparatus at the desired point in the well bore A The assembly C is clearly shown in Figures 3 to 7 and comprises a tubular body or housing 12 which is connected to the lower end of the pipe 11 by an adapter or coupling 13. A sleeve 14 telescopes the body 12, being freely slidable within the bore thereof, and normally the sleeve is in a raised position relative to said body, as shown in Figure 3. Axial sliding movement of said sleeve with respect to the body is limited by the co-action of diametrically opposed grooves or channels 15 formed in the wall of the bore of said body with radially projecting lugs 16 which extend outwardly from the upper portion of the sleeve. The groove and lug connection between the sleeve and housing also prevents any rotation of these parts with respect to each other. It might be noted that the upper ends of the grooves 15 are closed by the lower end of the adapter 13.

When the sleeve 14 is in a raised position (Figure 3) a pair of outlet ports 17, which are diametrically opposite each other, in said sleeve, are out of registration with similar outlet ports 18 provided in the body or housing 12 and obviously, when in such position, communication between the sleeve 14 and the well bore A outside of the housing 12 is shut off. Downward movement of the sleeve relative to the housing will result in the ports 17 in said sleeve registering with the ports 18 in the housing, whereby a flow from the bore of the sleeve, through the alined ports and into the well bore A may occur (Figure 4). Positive alinement of the ports 17 and 18 is assured because the sleeve cannot rotate relative to the housing due to the lug and groove connection therebetween. Since the bore of the sleeve 14 is in direct communication with the bore of the tubular conductor 10 through the pipe 11, it is manifest that the sleeve 14 and housing 12 provide a sleeve-type valve for controlling the flow from the conductor into the well bore. It is noted that the ports 18 could be eliminated and the ports 17 disposed so that when the sleeve 14 is in its raised position, said ports are within the housing 12 and when in a lowered position, said ports 17 move below the lower end of said housing. In such instance, it would not be necessary to prevent rotation of the housing with respect to the sleeve and a more simple construction would be had.

A flexible umbrella-type separating element D is slidably mounted on the pipe 11 and includes a plurality of flat metallic bars or spring members 19, the upper ends of which are secured to a collar 20 which surrounds the pipe 11 and which is freely movable thereon. The bars 19 support a covering 19a of canvas, or other flexible material, which is suitably fastened to the inner surfaces of the bars and when the element is in its expanded position, as shown in Figure 4, the inherent resiliency of the bars 19 holds said element in sealing engagement with the wall of the well bore. The lower end of the separating element is open.

The lower portion of said separating element is adapted to be held inwardly to maintain the element in a retracted position by a retaining collar 21 which is threaded onto the lower end of the telescoping sleeve 14. The collar is formed with an annular recess or groove 22 for receiving the lower portion of the element, the resiliency of the spring bars 19 permitting sufficient flexing of the element to allow the insertion of said lower portion into the recess as is illustrated in Figure 3. Angular latch bars or elements 19b which are secured to the inner wall of the element D project radially upwardly beneath the lower end of the housing 12 and these bars prevent the element from sliding upwardly on the pipe 11 when said element is in a retracted position during lowering of the device into the well bore. It is pointed out that when the collar is engaged with the element, the sleeve 14, having the collar attached thereto, is in its raised position so that the element D is retracted when the outlet ports 17 and 18 are closed. The collar 21 is provided with an axial opening 23 of slightly less diameter than the bore of the sleeve 14, whereby an internal annular seat or shoulder 24 is formed within said collar.

The separating element D completely encircles the housing 12 and has its upper and lower ends extending some distance beyond the extremities of said housing. As explained, said element is in a retracted position and is held so by the retaining collar when the sleeve 14 is in a raised position relative to the housing; in such position, the outer periphery of the element is spaced from the wall of the well bore A (Figure 3) and the apparatus may be readily lowered through the fluid column in the well bore to the desired position, the fluid in said bore by-passing the assembly during such lowering.

When the apparatus has been properly located within the well bore, a plug 25 is dropped or pumped downwardly through the conductor 10 and said plug will pass downwardly through the pipe 11 and sleeve 14, coming to rest upon the annular seat 24, (Figure 4) and thereby closing the bore of the sleeve. Subsequent application of fluid pressure within the bore of the conductor acts upon the plug 25, whereby the sleeve 14 is moved downwardly relative to the housing 12. Such downward movement of the sleeve moves the retaining collar 21 downwardly relative to the separating element D to disengage said collar from the element and permit said element to expand outwardly into engagement with the wall of the well bore. Any simultaneous downward movement of the element D is prevented at this time by the engagement of the lower end of the slidably mounted collar 20, to which the upper end of the element is secured, with the adapter or coupling 13.

As the sleeve 14 is moved downwardly to effect a release of the separating element D, the ports 17 in said sleeve are registered with the outlet ports 18 in the housing 12 so as to establish communication between the bore of the conductor 10 and the well bore A below the expanded element D which has engaged the wall of said well bore. Cement may then be pumped downwardly through the conductor 10 and sleeve 14 and since said sleeve has the lower end of its bore closed, the cement is directed outwardly through the alined ports 17 and 18. Manifestly, the separating element, having its outer periphery engaging the wall of the well bore, positively separates the incoming cement from the fluid column in the well bore above said element and therefore, the cement is prevented from channeling upwardly through said fluid; this results in the cement being maintained in a more or less compact mass with substantially no foreign fluid admixed therewith, whereby upon settling, said cement forms a solid plug which effectively closes or plugs the well bore.

The cement is, of course, introduced into the well bore A under pressure and as additional cement is ejected through the ports 17 and 18, this pressure is applied beneath the umbrella-like separating element D. As the cement builds up within the well bore, the element is moved upwardly within said bore, such upward movement being permitted because of the slidable mounting of the supporting collar 20 which has the element D attached thereto. It is noted that expansion of the element has moved the angular latch bars 19b from beneath the housing 12 (Fig. 4). The element is axially aligned within the well bore during its upward movement by a guide member 26 which has radial guide arms extending therefrom, said member being welded or otherwise secured to the collar 20. Manifestly, so long as cement is introduced, the separating element will rise with the cement column being built up in the well bore A and throughout its movement, said element will engage and ride upon the wall of the well bore to maintain a positive mechanical seal between said cement and any fluid in the well bore thereabove. By varying the length of the pipe section 11, the sliding movement or travel of the element D before it engages the circulating sub assembly B, may be varied so that any desired column of cement may be built up within the bore.

After the cement has been introduced into the well, the conductor 10 is lifted upwardly so as to raise the pipe 11, housing 12 and sleeve 14 out of said cement. Since the separating element D is slidable on the pipe 11, it will be obvious that lifting of the conductor and pipe will cause said pipe to slide upwardly through the element, said element remaining in position on top of the cement column because of its frictional engagement with the wall of the well bore. Lifting of the conductor and pipe continues until the upper end of the adapter 13 strikes the lower end of the collar 20 to which the element D is attached and subsequent raising of said conductor lifts the element D above the cement column which has been introduced into the bore. As soon as the lower end of the sleeve 14 is clear of the cement column, a circulation of fluid, such as drilling mud is begun, said fluid flowing downwardly through the conductor 10 and pipe 11 and outwardly through the registered ports 17 and 18. This fluid washes the interiors of said conductor and pipe to remove the cement which may remain therein. As the circulating fluid enters the well bore below the separating element and above the cement, the pressure of said fluid acting against the underside of the element D again slides the element upwardly on the pipe 11 and said element continues this upward movement until halted by its engagement with the circulating sub assembly. By this time, the interiors of the conductor 10 and pipe 11 are thoroughly cleansed and circulation may be halted, after which the conductor 10 and the apparatus attached thereto may be pulled upwardly and removed from the well.

Conditions may occur during the cementing operation which will halt such cementing prior to completion, as for example, the cementing equipment at the surface may break down. In such instance, the well conductor 10, as well as the pipe 11, will be full of cement and unless such cement is immediately cleaned out, the danger of "cementing up" the entire pipe is present. Because the cementing ports 17 and 18 are below the separating or sealing element and also because said element maintains a seal with the wall of the bore, it is impossible to obtain sufficient circulation downwardly through the conductor and back upwardly through the well bore to clean out the conductor 10.

To permit a thorough cleansing of the conductor to prevent its "cementing up" in case of breakdown of equipment, or for other reasons, the circulating sub assembly B is provided and, as explained, this assembly is connected to the lower end of the conductor 10. The assembly B is spaced sufficiently above the separating element D, that is, the pipe section 11 is of sufficient length, so that during the cementing operation, it is assured that the desired volume or amount of cement may be introduced through the ports 17 and 18 and beneath said element before the element moves upwardly high enough to strike said assembly. In other words, the desired volume of cement is introduced prior to the time that the separating element has been slid upwardly on the pipe section 11 to the position shown in Figure 2, in which position the guide collar 26, which is at the upper end of the separating element assembly C, has moved into engagement with the circulating sub assembly to actuate the same, as will now be explained.

The sub assembly B comprises an inner sleeve 27 which has its upper end connected to a tubular guide collar 28; the guide collar is, in turn, threaded into the lower end of the conductor 10 and is provided with radial guide arms 29, whereby the sub assembly is maintained in axial alinement within the well bore A. The lower portion of the sleeve 27 telescopes a sub 30 which is slidable on said sleeve. The lower portion of the bore of the sub is enlarged at 31 to form an internal shoulder 32 within the sub and a ring 33 which is threaded onto the lower end of the sleeve 27 is movable within this enlarged portion of said bore; as will be seen by observing Figure 8, the ring 33 is engaged by the internal shoulder 32 to limit the downward movement and to retain the sub on the sleeve 27. A coiled spring 34 surrounds the sleeve and is confined between the sub 30 and guide collar 28, said spring exerting its pressure to constantly urge the sub to its lowermost position with respect to the inner sleeve (Figure 8).

The sub has a pair of diametrically opposed ports 35 in its wall and when the sub is in a lowered position on the inner sleeve, said ports are below and out of registration with similar ports 36 formed in said sleeve. Manifestly, in such position, the ports are closed but upon upward movement of the sub 30 on the sleeve and against tension of the spring 34, the ports 35 and 36 are moved into registration (Figure 9), whereby a circulation of fluid downwardly through the conductor and upwardly through the well bore A above the separating element D is possible.

For preventing rotation of the sub 30 on the sleeve to assure proper alinement of the outlet openings or ports 35 and 36 and also to lock the sub in a raised position, a pivoted latch 37 is mounted within a recess 38 (Figure 12) in the wall of the sub above the shoulder 32. A small spring 39 is disposed within a bore 40 and has one end engaging the latch to urge said latch inwardly toward the sleeve. A plug 41 which is threaded into the outer end of the bore 40 closes said bore and retains the spring therein. When the sub is in its lowered position, the latch engages within a vertical groove or channel 42 in the external surface of the sleeve 27 and acts to prevent rotation of the sub on said sleeve. As the sub moves upwardly on the sleeve, the latch rides upwardly in the groove and upon the sleeve reaching a position placing the ports 35 and 36 in registration, the latch engages within a locking recess 43 which is formed in the external surface of the sleeve 27 at the upper end of the groove. Such engagement of the latch within the recess locks the sub in its raised position, thereby locking the outlet ports in an open position.

When the apparatus is lowered into the well bore A, the sub 30 is in a lowered position closing the circulating ports and the sub remains in such position so long as the cementing proceeds satisfactorily. If for any reason, the cementing operation is interrupted, then a suitable fluid is circulated downwardly through the conductor 10 and pipe 11 to clean the interiors thereof and the pressure of this fluid, which escapes through the ports 17 and 18 raises the separating element D to the position shown in Figure 2. In this position, the upper end of the guide 26 is engaged with the lower end of the sub 30 and said sub is moved upwardly on the inner sleeve 27 against tension of the spring 34 to register the circulating ports 35 and 36. When said ports are registered, the latch 37 has engaged within the locking recess 43 to prevent return of the sub to its original or lowered position. Circulation of fluid may then be carried out by pumping the fluid downwardly through the conductor, such fluid escaping through the open ports 35 and 36 and then flowing upwardly in the well bore to thoroughly cleanse the conductor of the cement therein. Thus, the sub provides a safety means which obviates the danger of "cementing up" the well conductor 10.

The operation of the apparatus is obvious. The assembly is lowered in the well bore A with the various elements in the position shown in Figures 1, 3 and 3, the separating element D being retracted, the cementing ports 17, 18 closed and the circulating ports 35, 36 also closed. If desired, the element D may be filled with drilling fluid, or the like, to prevent its complete collapse by external pressures. When the assembly C reaches the position at which cement is to be introduced, the plug 25 is dropped or pumped downwardly and comes to rest on the seat 24 closing the bore of the telescoping sleeve 14. Subsequent application of pressure to said plug moves the sleeve downwardly with respect to the housing 12, whereby the element D is released and expanded and the ports 17 and 18 are registered to permit the introduction of cement through said ports and into the well bore below the expanded element. As the cement continues to be introduced, the sealing element slides upwardly on the pipe 11 and maintains a seal with the well bore to prevent channeling of the cement upwardly through the fluid in the bore above said element. As explained, the sub assembly B is spaced sufficiently above the element to assure that the desired amount of cement may be introduced and thus, when the cementing operation is complete, the element D is at some point on the pipe 11 spaced below the sub assembly.

After the cementing is complete, the conductor 10 and pipe 11 are raised upwardly, the latter moving through the element D which is held stationary on top of the cement column because of its frictional engagement with the wall of the bore. Upward movement of the conductor continues until the housing 12 engages the collar 20 of the separating element assembly C and raises the same and also until the lower end of the sleeve 14 is clear of the cement. A suitable fluid is then circulated downwardly through the conductor and pipe and outwardly through the ports 17 and 18 to thoroughly cleanse said conductor and pipe of any cement therein. This circulation is permitted since the separating element D, while still maintaining a seal with the bore, can again ride upwardly on the pipe 11. After the conductor and pipe have been cleaned of cement, the entire apparatus is removed by means of the conductor.

From the foregoing, it will be seen that the circulating sub assembly B is inactive during the cementing operation. However, if for any reason, the cementing is halted prior to completion, in which event a relatively large portion of the conductor would be filled with cement, it is necessary that some means of circulating this cement out of said conductor be provided and it is under such conditions that said sub is actuated. To actuate the sub, fluid is circulated downwardly on top of any cement in the conductor and this results in the separating element being raised to the position shown in Figure 2, whereby the sub 30 is raised and the circulating ports 35 and 36 are registered. The ports are locked in open position by the latch 37 and continued circulation of fluid cleans the conductor 10 of any cement therein. Thus, it is apparent that the sub assembly is a safety feature which obviates danger of "cementing up" the conductor in the event that some unforeseen circumstance may prevent completion of the cementing operation.

The foregoing description of the invention is explanatory thereof and various changes in the size, shape and materials as well as in the details of the illustrated construction, may be made within the scope of the appended claims and without departing from the spirit of the invention.

What I claim and desire to secure by Letters Patent is:

1. A well cementing apparatus including, a tubular conductor adapted to be lowered into a well bore and having an outlet opening in its lower portion, a sleeve telescoping the lower portion of the conductor and having an opening therein adapted to register with the outlet opening to establish communication between the conductor and well bore when the sleeve moves downwardly relative to the conductor, a collar slidably mounted on the conductor above said opening, an annular flexible separating element surrounding the conductor and having its upper end secured to the collar with its lower end open, said element having an inherent flexibility tending to urge the element radially outwardly toward the wall of the well bore, the sleeve having its lower end projecting from the conductor and having means attached thereto for receiving and confining the lower end of the separating element when the sleeve is in a raised position closing the outlet port in the conductor, downward movement of the sleeve simultaneously opening the port and releasing the separating element, whereby cement may be introduced into the well bore below the element from said conductor.

2. A cementing apparatus as set forth in claim 1, together with pressure means for imparting a downward movement to the sleeve to open said outlet and release said element.

3. As a sub-combination in a well cementing apparatus, a circulating sub assembly including, an inner sleeve having an outlet port therein, a tubular sub slidable on said sleeve and having a port adapted to register with the port in said sleeve when said sub is moved upwardly relative to the sleeve, resilient means for urging the sub toward its lowered position with respect to the sleeve to maintain the ports out of registration, and latch means for locking the sub in its raised position to lock the ports in their registered position.

4. The sub-combination set forth in claim 3, wherein the latch means comprises a pivoted latch mounted on the sub and a locking recess formed in the sleeve, the sleeve also having a groove with which said latch co-acts to prevent rotation of the sub on the sleeve during movement of said sub.

5. A well cementing apparatus including, a tubular conductor adapted to be lowered into a well bore, means at the lower portion of the conductor for establishing communication between the bore of the conductor and the well bore, said means being normally closed, an expansible separating element slidably mounted on the conductor above the communication establishing means and arranged to close off the annular space between the conductor and well bore when in an expanded position, whereby when cement is introduced into the bore from the conductor the element will mechanically separate the cement from the fluid column thereabove, a connection between the communication means and the separating element when said communication means is closed, said connection functioning to normally retain the element in a retracted position, and pressure actuated means for simultaneously opening the communication means and for releasing the connection between said means and said separating element to permit expansion of the latter.

6. A cementing apparatus, of the character described including, a tubular conductor adapted to be lowered into a well bore and having an outlet opening in its lower portion whereby fluid from said conductor may be ejected into the well bore, valve means for controlling the flow through said opening which valve means is normally closed, an expansible separating element slidably mounted on the conductor above the outlet opening and arranged to close off the annular space between the conductor and well bore when in an expanded position whereby fluid ejected through the outlet opening is prevented from admixing with the fluid column in the well bore above said element, a connection between the valve means and the separating element when said valve means is closed, said connection functioning to normally retain the element in a retracted position to facilitate insertion of the apparatus within the well bore, and means for simultaneously opening said valve means and for releasing the connection between said valve means and said separating element to release the element for expansion when it is desired to introduce fluid into the well bore below said element.

7. A well cementing apparatus including, a tubular conductor adapted to be lowered into a well bore and having an outlet opening in its lower end, a sleeve valve within the lower portion of the conductor arranged to co-act with the outlet opening to open and close the same for controlling the flow therethrough, said sleeve valve being normally in a raised position closing said opening, an expansible separating element having an open lower end slidably mounted on the conductor above the outlet opening, said element being constructed so that when in its expanded position it closes off the annular space between the conductor and well bore whereby fluid ejected through the outlet opening is prevented from channeling upwardly through the fluid column in the bore above said element, and means on the extreme lower end of said sleeve valve adapted to co-act with the lower portion of the separating element when said valve is raised for holding the element in a retracted position, downward movement of said sleeve valve simultaneously opening the outlet port and effecting release of the separating element to permit expansion of the latter.

8. A cementing apparatus, of the character described including, a tubular conductor adapted to be lowered into a well bore and having an outlet opening in its lower portion whereby fluid from said conductor may be ejected into the well bore, valve means for controlling the flow through said opening which valve means is normally closed, an expansible separating element slidably mounted on the conductor above the outlet opening and arranged to close off the annular space between the conductor and well bore when in an expanded position whereby fluid ejected through the outlet opening is prevented from admixing with the fluid column in the well bore above said element, means for slidably mounting the separating element on the conductor to permit said element to move upwardly as additional fluid is introduced into the well bore therebelow, and a circulating sub-assembly connected in the conductor and spaced a predetermined distance above the separating element and having normally closed circulating ports therein, said separating element being adapted to engage and actuate the sub-assembly as said element moves upwardly, whereby the circulating ports are opened to allow a fluid circulation above the separating element.

9. A well cementing apparatus as set forth in claim 8, together with means in the sub-assembly for latching the assembly in a position holding the circulating ports open.

10. A cementing apparatus, of the character described including, a tubular conductor adapted to be lowered into a well bore and having an outlet opening in its lower portion whereby fluid from said conductor may be ejected into the well bore, valve means for controlling the flow through said opening which valve means is normally closed, an expansible separating element slidably mounted on the conductor above the outlet opening and arranged to close off the annular space between the conductor and well bore when in an expanded position whereby fluid ejected through the outlet opening is prevented from admixing with the fluid column in the well bore above said element, means for slidably mounting the separating element on the conductor to permit said element to move upwardly as additional fluid is introduced into the well bore therebelow, a circulating sub-assembly mounted on the conductor and spaced above the separating element, said assembly including an inner sleeve having an outlet port and connected in the conductor, a sub slidable on the sleeve and having a port adapted to register with the port in the sleeve when in a raised position, and means for normally maintaining the sub in a lowered position with the ports out of registration, the sub being adapted to be engaged and moved upwardly by the separating element to register the ports and thereby permit a circulation of fluid to be carried out above the element.

11. A well cementing apparatus including, a tubular conductor adapted to be lowered into a well bore, a valve-controlled outlet opening in the lower portion of the conductor whereby fluid may be ejected from said conductor into the well bore, an expansible separating element slidably mounted on the conductor above the outlet opening for closing off the annular space between the conductor and well bore, whereby fluid ejected through said outlet opening is prevented from admixing with the fluid column in the well bore above said element, said conductor having another outlet opening therein and spaced above the first opening and also above the separating element, and valve means normally closing said second outlet opening and being arranged to be engaged and actuated by the separating element to open said second outlet when said element has moved a predetermined distance upwardly on said conductor.

CHARLES A. BROKAW.